Sept. 11, 1934.　　　　J. S. PARSONS　　　　1,973,097
NETWORK PROTECTOR
Filed July 30, 1932.　　　3 Sheets—Sheet 1

WITNESSES:　　　　　　　　　　　　　　　INVENTOR
　　　　　　　　　　　　　　　　　　　　John S. Parsons.
　　　　　　　　　　　　　　　　　　　　BY
　　　　　　　　　　　　　　　　　　　　　　ATTORNEY INVENTOR
John S. Parsons.

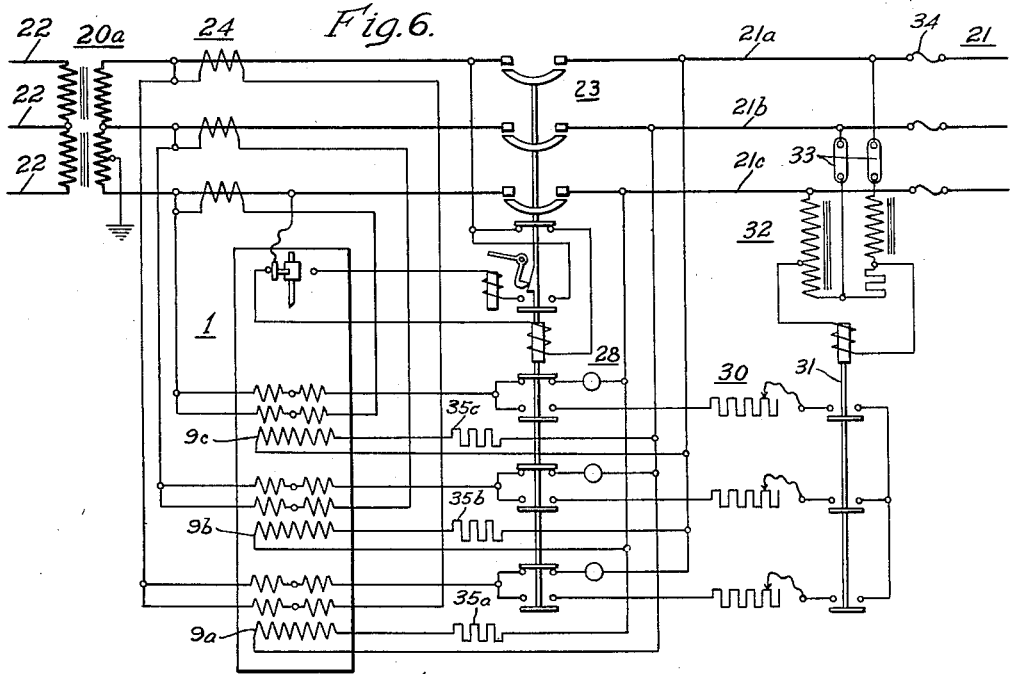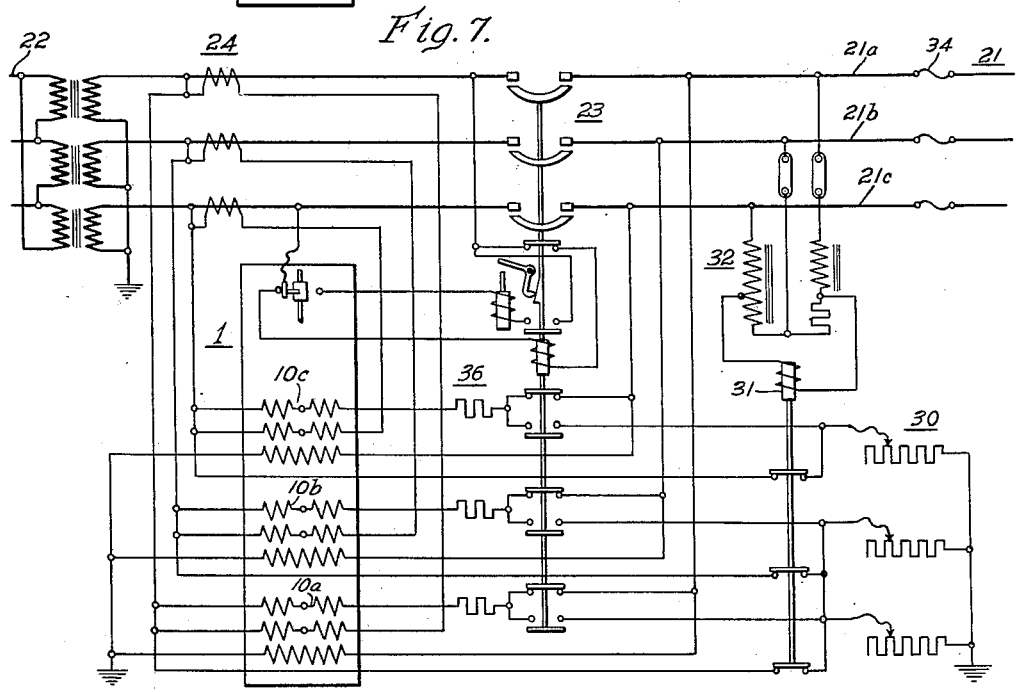

Patented Sept. 11, 1934

1,973,097

UNITED STATES PATENT OFFICE 1,973,097

NETWORK PROTECTOR

John S. Parsons, Swissvale, Pa., assignor to Westinghouse Electric & Manufacturing Company, East Pittsburgh, Pa., a corporation of Pennsylvania Application July 30, 1932, Serial No. 627,083

14 Claims. (Cl. 175—294)

My invention relates to protective apparatus for use in distribution systems and particularly to automatic protectors for controlling the connection and disconnection of power circuits of such systems in response to electrical conditions thereof.

My invention is particularly applicable to distribution systems in which a plurality of feeders supply power to a common distribution network by means of a plurality of banks of transformers connected between each of the feeders and the network. In order to control the connection and disconnection of the secondary windings of the transformers and the network, in such systems, automatic network protectors are provided, which operate to connect each bank of transformers individually to the network when the transformer bank is in proper electrical condition to supply power to the network and to disconnect the transformer bank when, because of an abnormal circuit condition, the latter is unable to supply power to the network.

In such automatic protectors, a circuit breaker is controlled by means of one or more master relays in such manner that the circuit breaker is opened in response to power flow in excess of a predetermined minimum in the reverse direction to normal or in response to an analogous voltage and current condition, and is automatically reclosed when the transformer secondary voltage and the network voltage assume a predetermined relationship of magnitude and phase position. The master relays are usually of the power-directional induction disc type, and the same relay or group of relays performs both the tripping function of opening the circuit breaker under abnormal conditions and the closing function of reclosing the circuit breaker under proper voltage conditions.

In order to accomplish its closing function, the power-directional relay is connected to respond to the network voltage and to the voltage across the open circuit breaker contacts. When the relay is connected in this manner the variable which controls its operation is not power, but the vector product of the voltages mentioned above. The relay is designed to cause closure of the circuit breaker when the component of transformer secondary voltage in phase with the network voltage exceeds the network voltage by a predetermined minimum amount, usually a fraction of a volt. In order to provide for closure of the circuit breaker when the associated bank of transformers is energized and the network is dead, under which conditions the desired relationship of voltage variables does not exist, the relay is biased to closed position by any suitable means, such as a spring.

The tripping function of the power-directional relay may be accomplished with a sensitive relay setting, in which case the master relay operates in response to reverse power of comparatively small value such as the magnetizing current of the associated transformer bank, or it may be accomplished with an insensitive setting amounting to a considerable percentage of the rated capacity of the associated transformer bank.

When the power-directional relay is operated with sensitive setting, the response of the relay to the heavy reverse currents occasioned by faults in the feeder from which it is supplied, or in any transformer bank connected to the feeder, is usually prompt and positive. However, as switching and synchronizing operations in the system, and regenerative operations of dynamo-electric machinery fed from the network, often produce sufficient reverse power to operate the relay when its setting is sensitive, a large number of unnecessary opening and closing operations of the circuit breaker usually occur under these conditions.

On the other hand if the relay setting is made insensitive to reduce the number of unnecessary operations of the circuit breaker, there is danger that the relay may fail to operate under conditions of low voltage and low power factor occcasioned by a fault, although the reverse current occasioned by the fault may be heavy. Upon such a failure of the relay, the circuit breaker would remain closed under the conditions most adverse to the safety of the equipment. Fuses are usually provided to interrrupt the power circuits under these conditions. However, as the protector may be situated at a considerable distance from the generating station or substation from which it is supplied, and as the transformer bank is out of service until the fuses are replaced, it is advantageous and preferable to obtain protection from the circuit breaker rather than the fuses.

Neither the sensitive nor the insensitive operation of the protector, therefore, is entirely satisfactory in the average application, as it is desirable to obtain insensitive operation during normal conditions and sensitive operation under fault conditions. It is particularly desirable that the relay operate entirely without restraint and therefore with maximum sensitivity, under fault conditions.

It is accordingly an object of my invention to provide a novel automatic protector in which the power-directional relay shall operate with insensitive setting under normal circuit conditions and shall operate without restraint under fault conditions.

Other objects of my invention will become evident from the following detailed description taken in conjunction with the accompanying drawings in which Figure 1 is a diagrammatic view in perspective of the principal operating elements of a power-directional relay which may be used in the practice of my invention.

Figs. 6 and 7 are diagrammatic views of modifications of the protector shown in Fig. 2.

Figure 1:
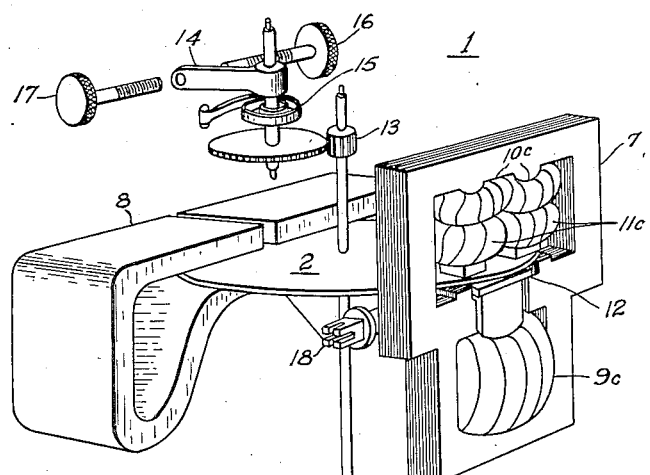
Figure 1:
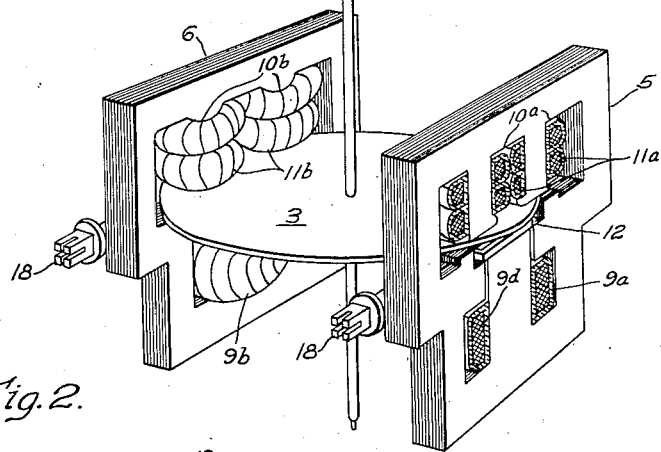

Referring to Fig. 1 of the drawings, the principal operating elements of a polyphase power-directional relay 1, of the type disclosed in my copending application, Serial No. 333,490, filed January 18, 1929 and assigned to the Westinghouse Electric and Manufacturing Company are shown therein. A pair of induction discs 2 and 3 are rigidly secured to a pivotally mounted spindle 4 for rotation with the latter. A pair of driving magnets 5 and 6 are mounted in positions to exert driving torque on the induction disc 3 in a well known manner, and a third driving magnet 7 is similarly mounted with reference to the induction disc 2. A pair of drag magnets 8 are associated with the disc 2 to exert a torque retarding the motion of the rotating assembly comprising the discs 2 and 3 and the spindle 4.

Each of the driving magnets 5, 6 and 7 is provided with a potential winding 9a, 9b and 9c, a pair of phasing windings 10a, 10b and 10c and a pair of current windings 11a, 11b and 11c, respectively. The windings 9a, 10a and 11a are shown partly in section to illustrate the shape of the driving magnet 5.

A copper loop or shading coil 12 is provided on each of the potential poles, such as pole 9d shown in connection with the potential winding 9c, to cause the flux produced by the potential pole to lag the voltage applied to the voltage windings 9a, 9b or 9c, for a purpose which will hereinafter appear.

The spindle 4 is mechanically connected by means of suitable gearing 13 to a shaft upon which is secured the movable contact member 14 of the relay. The movable contact member 14 is biased by means of a spring 15 into engagement with a stationary adjustable closing contact member 16, and may be rotated by means of the induction disc mechanism through an adjustable angle to engage an adjustable trip contact member 17.

Each of the driving magnets 5, 6 and 7 is provided with an over-voltage adjusting mechanism, the adjusting bolt 18 of which appears in Fig. 1.

Figure 2:
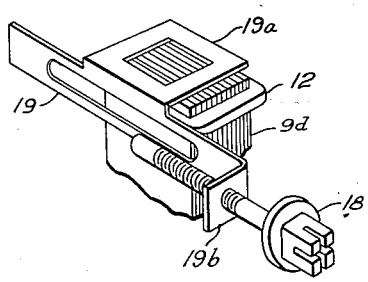
Fig. 2 is a perspective view of a detail of the relay shown in Fig. 1.

Referring to Fig. 2, which shows the over-voltage adjusting mechanism for the potential pole 9d of the driving magnet 5, in detail, the adjusting bolt 18 is rotatably supported by means of a bracket (not shown) and engages an internally threaded lug portion 19b of a copper stamping 19. The copper stamping 19 is bent and perforated to form a shading loop 19a, which extends over the pole face, parallel to the induction disc (not shown). The shading loop 19a lies in the air gap between face of the potential pole member 9d and the induction disc. By displacing the shading loop 19a from the center of the pole member 9d, in either direction, part of the flux produced by the potential pole member may be lagged or displaced in phase position. A shifting component of potential flux is thereby produced to cause a torque to be exerted in either direction upon the induction disc.

Figure 3:
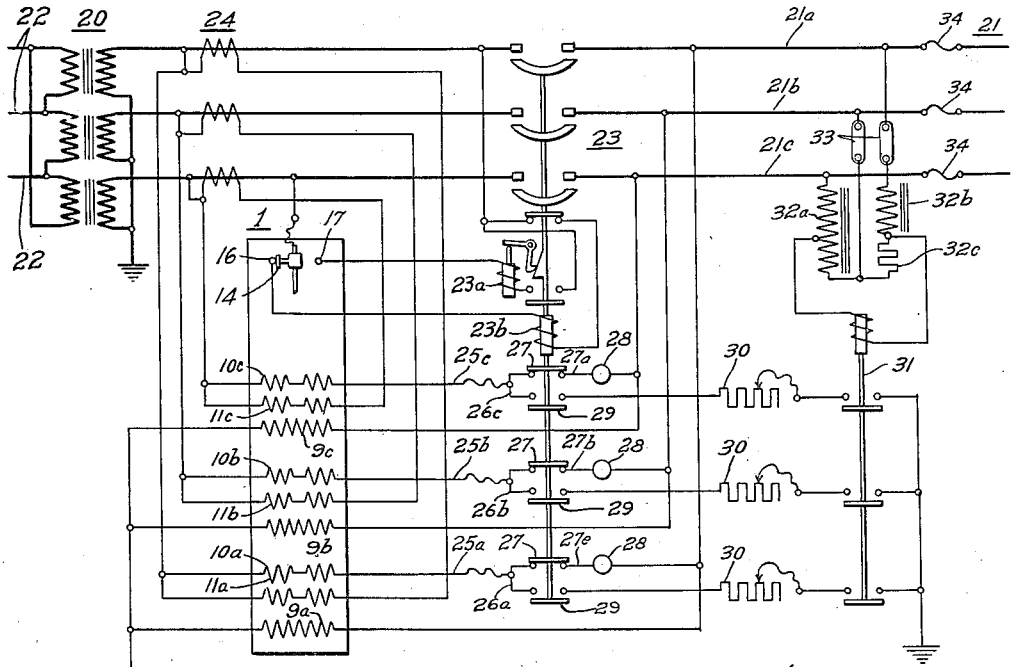
Fig. 3 is a diagrammatic view of an automatic protector embodying my invention.

Referring to Fig. 3, which shows a network protector embodying my invention, a transformer bank 20, which may be one of a number of similar banks for supplying power to a distribution network 21, is connected between a feeder 22 and one side of a circuit breaker 23. I have illustrated the primary windings of the transformer bank 20 connected in delta to the feeder 22, and the secondary windings connected in Y with grounded neutral, but it will be understood that my invention may be practiced with other connections known in the art. The circuit breaker 23 is connected between the secondary windings of the transformer bank 20 and the conductors 21a, 21b and 21c of the network 21.

The circuit breaker 23 is provided with any suitable trip mechanism illustrated as a shunt trip coil 23a, and a closing motor or coil 23b, controlled by the tripping contact member 17 and the closing contact member 16, respectively of the power directional relay 1 in a manner well understood in the art.

The current windings 11a, 11b and 11c of the relay 1 are connected to be energized by means of a set of current transformers 24 in accordance with the phase currents in the secondary windings of the transformer bank 20.

The phasing windings 10a, 10b and 10c of the relay 1 are connected by means of conductors 25a, 25b and 25c between secondary terminals of the transformer bank 20 and junction points 26a, 26b and 26c respectively. The circuits of each of the phasing windings 10a, 10b and 10c, divides at the junction points 26a, 26b and 26c, respectively, and one part of each phasing circuit is connected through back auxiliary contact members 27 of the circuit breaker 23 and suitable phasing resistance elements, which I have illustrated as phasing lamps 28, to corresponding phase conductors 21a, 21b or 21c of the network 21. The other part of each phasing circuit is connected through front auxiliary contact members 29 of the circuit breaker 23, adjustable resistors 30, and the contact members of a voltage responsive relay 31, to ground.

The voltage responsive relay 31 is connected by means of a voltage phase sequence network 32, preferably of the type disclosed in the copending application of B. E. Lenehan, Serial No. 613,583, filed May 25, 1932, and assigned to the Westinghouse Electric and Manufacturing Company, to be energized in accordance with the positive symmetrical components of the polyphase voltage of the distribution network 21.

The phase sequence network 32 is connected to the distribution network 21 by means of a pair of removable conducting links 33. The elements which comprise the phase sequence network 32 are an auto-transformer 32a having a tap to provide a voltage less than half of the total voltage impressed on the auto-transformer, for example a 40% tap, and a reactor 32b and resistor 32c having a combined lagging phase angle of 60°. The coil of the voltage responsive relay 31 is connected to the auto-transformer 32a and resistor 32c in such a manner that the voltage impressed thereon is the vector sum of 40% of the voltage between conductors 21b and 21c and a voltage equal to 40% of the voltage between conductors 21a and 21b but lagging the latter voltage by a phase angle of 60°. Assuming that the phase rotation of network voltages is as indicated by the subscripts a, b and c of the network conductors, the voltage impressed on the coil of relay 31 is proportional to the positive phase sequence voltage components, as explained in the above mentioned application of B. E. Lenehan.

The voltage responsive relay 31 is designed to close when the positive symmetrical components of network voltage exceed a predetermined value, for example 95% of the normal balanced network voltage, and to drop out when the positive symmetrical components fall below a predetermined minimum value, for example 85% or 90% of the normal balanced network voltage.

The current transformers 24 are preferably of a well-known saturable design to limit the maximum current which can be supplied to the current windings 11a, 11b and 11c and thereby limit the heating and mechanical forces which may be developed by the current winding. Similarly, the phasing lamps 28 are preferably of the tungsten filament type and have a high positive temperature co-efficient of resistance, to limit the maximum current and heating effect in the phasing windings 10a, 10b and 10c.

The potential windings 9a, 9b and 9c of the relay 1 are connected between the conductors 21a, 21b and 21c of the network 21 and ground, to respond to the network star voltages. Fuses 34 are provided for protecting the transformer bank 20 against excessive currents in the normal direction and also against excessive reverse currents which may occur under fault conditions when the voltage applied to the potential windings 9a, 9b and 9c may be below values at which the relay 1 can be relied upon for certain operation.

The three groups of current and potential windings 9a, 11a; 9b, 11b; and 9c, 11c, respectively, are connected in such relative directions that when power flows from the transformer bank 20 to the network 21, the torque of each of the driving magnets 5, 6 and 7, (shown in Fig. 1) tends to maintain engagement of the movable contact member 14 and the closing contact member 16. When power flows from the network 21 to the transformer bank 20, the torque of each of the driving magnets 4, 5 and 6 tends to rotate the movable contact member 14 out of engagement with the closing contact member 16 and into engagement with the tripping contact member 17.

The phasing windings 10a, 10b and 10c are connected in such relative directions as compared with the potential windings 9a, 9b and 9c, respectively, that when the circuit breaker 23 is open and the network 21 is energized from other transformer banks (not shown), the torque of each of the driving magnets 5, 6 and 7 tends to cause engagement of the movable contact member 14 and the closing contact member 16, if the transformer secondary voltage is in phase with the network voltage and exceeds the network voltage by more than a predetermined amount, such as a fraction of a volt, as mentioned above. If the component of transformer secondary voltage in phase with the network fails to exceed the network voltage by the predetermined amount mentioned above, the torque of each of the driving magnets tends to cause engagement of the movable contact member 14 and the tripping contact member 17.

The relationship of transformer secondary voltage and network voltage necessary to cause a closing operation of the relay 1 may better be understood by reference to curve A of Fig. 3. Referring to Fig. 3, the vector $E_n$ which is taken as the reference vector, represents the network voltage. If a vector representing the transformer secondary voltage be drawn on this figure from the origin O, to the same scale as $E_n$ and displayed therefrom by the phase angle existing between the transformer secondary voltage and the network voltage, a closing operation of relay 1 is indicated if the transformer secondary voltage vector terminates above the curve A. If the vector corresponding to the transformer secondary voltage terminates below the curve A, a tripping operation, i. e. engagement of contact members 14 and 17 of relay 1, is indicated.

Curve B represents the central part of curve A plotted on a larger scale and moved down to the point at which the origin O coincides with the upper end of the vector $E_n$. Curve B represents the range of phasing voltages encountered during normal operation. It will be noted that curve B lies slightly above the origin O. To produce this displacement of the curve B, which represents a biasing torque, it is necessary to adjust the bolts 18 (Fig. 2) so that the torque produced by the shading coils 19a acts in opposition to, and is slightly greater than the torque produced by the spring 15. When the over-voltage adjusting mechanism is adjusted in this manner, the relay 1 is biased to closing position when the potential windings 9a, 9b and 9c are de-energized, and is biased to tripping position when the potential coils are energized by the normal network voltage.

Curve C of Fig. 3 represents the limiting locus of line current vectors which will cause a tripping operation of the relay 1 when the phasing coils 10a, 10b and 10c are short-circuited through the phasing lamps 28. It will be noted that as the phasing windings 10a, 10b and 10c are mounted on the same pole members as the current windings 11a, 11b and 11c, the effect of the phasing windings, when short-circuited, is to cause the flux produced by the current windings to lag the current in the current windings, in a manner similar to the operation of the shading coil 12 associated with the potential poles. The constants of the shading coils 12, phasing windings 11a, 11b and 11c and phasing lamps 28 are so related that the watt tripping characteristic of the relay 1, illustrated by curve C of Fig. 3 is produced when the phasing windings 11a, 11b and 11c are short-circuited through the phasing lamps 28. It will be understood that if the vector representing balanced three phase current, drawn from the origin O and displaced from the network voltage vector $E_n$ by the power factor phase angle of the transformer secondary current, terminates below the curve C a tripping operation of the relay 1 is indicated.

Curve D of Fig. 3 represents the limiting locus of line current vectors which will cause a tripping operation of the relay 1 when the phasing windings 10a, 10b and 10c are connected in star through the resistors 30 between the conductors 21a, 21b and 21c, respectively and ground. It will be noted that when the phasing windings 10a, 10b and 10c are connected in this manner, the network voltage causes a component of current to flow in them, and as the resistors 30 must be comparatively large to limit this current flow, the lagging effect of the phasing windings as shading coils upon the current poles is greatly reduced. The effect of the phasing windings 10a, 10b and 10c, with the latter connections is therefore to shift the curve C downward corresponding to a strong biasing or restraining torque, and to rotate it clockwise to produce curve D. Curve D represents the tripping characteristic of the relay 1 for insensitive operation. The clockwise rotation of this curve is desirable as it makes the operation of the relay on lagging reverse currents more positive.

Curve E of Fig. 3 represents the limiting locus of line current vectors which will produce a tripping operation of the relay 1 when the phasing windings 10a, 10b and 10c are open-circuited. This curve represents the tripping characteristic of the relay 1 as used in the system shown in Fig. 3 during fault conditions as will hereinafter be more fully explained.

Assuming that initially both the feeder 22 and the network 21 of Fig. 3 are deenergized and the various elements are in the position indicated in Fig. 3, the operation of the apparatus shown in the latter figure may be set forth as follows: If the feeder 22 is first energized, the transformer bank 20 develops a secondary voltage, but no secondary current flows as the circuit breaker 23 is open. No current flows in the current windings 11a, 11b or 11c of the relay 1. Each of the phasing windings 10a, 10b and 10c is now connected in series with a corresponding potential winding 9a, 9b and 9c and a phasing lamp 28 between a corresponding secondary terminal of the transformer bank 20 and ground. A current accordingly flows in both the potential windings and the phasing windings. Assuming that no translating devices are connected to the dead network 21, the same current flows in each of the phasing windings 10a, 10b and 10c and the corresponding potential windings 9a, 9b and 9c. Because of the quadrature space displacement of the potential poles and the current poles, however, the in-phase currents in the potential and phasing coils produce no torque, except the negligible torque produced by the over-voltage loops 19a when acted upon by the greatly reduced potential pole flux. The spring 15 accordingly maintains the movable contact member 14 in engagement with the closing contact member 16.

If any translating devices are connected to the dead network 21, part of the current carried by the phasing windings 10a, 10b and 10c is shunted away from the corresponding potential windings 9a, 9b and 9c, thereby producing a phase displacement between the current pole flux and the potential pole flux, and a torque in the relay 1. An analysis of this condition will show that for the ordinary load conditions of resistive or inductive loads on the dead network, the torque produced in this manner is a closing torque tending to maintain engagement of the movable contact member 14 and the closing contact member 16.

A circuit for the closing coil 23b of the circuit breaker 23 is completed through the contact members 14 and 16 of the relay 1, and the circuit breaker 23 closes and is latched in. The circuit breaker 23, in closing, energizes the potential coils 9a, 9b and 9c of the relay 1, the phase-sequence network 32 and the distribution network 21.

Assuming that the positive symmetrical components of network voltage now exceed 95% of the balanced normal network voltage, as would be the case under normal supply voltage conditions, the voltage-responsive relay 31 closes to connect the phasing windings 10a, 10b and 10c of the relay 1 in series with the resistors 30 between the corresponding conductors of network 21 and ground.

The phasing windings 10a, 10b and 10c now cooperate with the potential windings 9a, 9b and 9c respectively, to produce a restraining torque in the relay 1 which causes the relay 1 to operate with the tripping characteristic D of Fig. 3. By adjusting the resistors 30, the restraining torque may be adjusted to meet the requirements of the particular application in which the protector is used. The insensitive setting of the relay 5 permits a considerable reverse current, such as may be produced by switching operations or synchronizing or regenerative operations of dynamo-electric machinery associated with the system, to flow without causing a tripping operation of the relay 1.

If a fault occurs on the network 21, the full capacity of the transformer bank 20 and of the other transformer banks connected to the network 21 is available to burn the fault clear in the usual manner.

If a fault occurs on the feeder 22, the direction of power flow reverses and considerable reduction of one or more phase voltages occurs, depending upon the nature of the fault. In response to the reduction of voltage, the positive symmetrical components of network voltage decrease and the voltage responsive relay 31 drops out to open the circuits of the phasing windings 10a, 10b and 10c. The relay 1 now operates without restraining torque in accordance with the sensitive characteristic curve E of Fig. 3. In response to the heavy reverse fault current flowing, the torque of the relay 1 is reversed and the movable contact member 14 moves at a rapid though timed rate into engagement with the tripping contact member 17. Upon engagement of contact members 14 and 17, a circuit for the trip coil 23a of circuit breaker 23 is completed and the latter trips open.

The circuit breaker 23, in opening, closes its auxiliary contact members 27 to thereby connect the phasing windings 10a, 10b and 10c of the relay 1 in series with the phasing lamps 28 across the main contact members of the circuit breaker 23 which are now open.

The relay 1 now operates with the closing characteristic shown in curve A or on larger scale in curve B of Fig. 3. Assuming that the fault on feeder 22 has cleared and the feeder voltage has been restored, the relay 1 operates to close the circuit breaker 23 when the secondary voltage of transformer 20 exceeds the network voltage by at least the minimum value corresponding to the setting of the adjusting bolts 18, and bears such phase relationship to the network voltage that a vector representing the transformer secondary voltage terminates above the curve A of Fig. 4, as mentioned above.

Although the insensitive operation of the protector shown in Fig. 2, with automatic change to sensitive operation under fault conditions is preferable in the majority of applications, it may be desirable, in some cases, to operate the protector without the insensitive feature so that the protector may be opened in response to the magnetizing current of the transformer bank 20 associated therewith. To obtain sensitive operation of the protector under all conditions, the links 33 are removed and the conductors 25a, 25b and 25c are disconnected from the junction points 26a, 26b and 26c and connected to terminals 27a, 27b and 27c, respectively. When the latter connections are made, the phasing windings 10a, 10b and 10c are short-circuited through the phasing lamps 28 when the circuit breaker 23 is closed, and the relay 1 operates with the sensitive tripping characteristic indicated by curve C of Fig. 3. When the circuit breaker 23 is open, the relay 1 operates with the closing characteristic indicated by curves A and B of Fig. 3, in the manner previously described.

Figure 5:
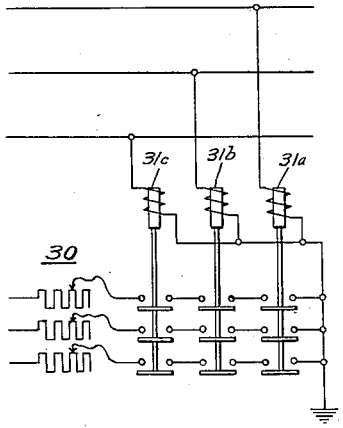
Fig. 5 is a diagrammatic view of a system of voltage responsive relays which may be substituted for the voltage responsive relay and phase sequence network of Fig. 3.

Fig. 5 shows an arrangement of three voltage-responsive relays 31a, 31b and 31c which may be substituted for the voltage-responsive relay 31 and phase sequence network 32 of Fig. 3. The voltage-responsive relays 31a, 31b and 31c are preferably connected to respond to star voltages of the networks and are designed to close when the voltages impressed upon them are approximately 95% of normal value and to drop out when the voltages fall below 85% or 90% of normal value.

Fig. 6 shows a modification of the protector shown in Fig. 3, for use in distribution systems in which a plurality of networks are supplied by means of open delta connected transformer banks, from one or more feeders. Referring to Fig 6, the bank of transformers 20a is connected in open delta with a secondary midtap grounded, between the feeder 22 and the circuit breaker 23. The remaining elements of Fig. 6 are connected in the same manner as the corresponding elements of Fig. 3, except that the relay 31 does not connect the resistors 30 to ground, and the connection of the potential windings 9a, 9b and 9c of the relay 1 is different. The potential windings 9a, 9b and 9c instead of being connected in star, are each connected in a circuit which includes a resistor 35a, 35b or 35c, respectively, to be energized by phase voltages which are displaced 90° from the in-phase position of the corresponding phase currents. The resistors 35a, 35b and 35c are of such resistance value that the voltage impressed upon each of the potential windings 9a, 9b and 9c leads the phase voltage from which it is energized by 60° or 70°.

The purpose of these connections is to insure proper operation of the relay 1 during fault conditions. In systems in which open delta transformer connections, such as shown in Fig. 6, are employed, the lighting loads on the networks are commonly fed from different phases to balance the load on the feeders. The transformers having the mid-tap are therefore connected to phases a and b on one network, phases b and c on another network; phases a and c on another network, etc. Because of these connections, the open delta connection of the primary windings of a transformer bank is closed through some other transformer bank supplied by the same feeder. Two of the current windings of the protective relay are therefore, in effect, connected inside of the delta, and a star connection of the relay potential windings would therefore be unsatisfactory for reasons known in the art.

Referring to Fig. 7, which shows a modification of the protector shown in Fig. 3, the various elements of the protector are connected and arranged in the same manner as the corresponding elements of Fig. 3, except that resistors 36, of approximately the same resistance value as the phasing lamps 28, are connected in series with each of the phasing windings 10a, 10b and 10c. In Fig 7, also, the voltage responsive relay 31 is provided with back contact members rather than front contact members and is arranged to short circuit each of the phasing windings 10a, 10b and 10c through a resistor 36, in dropping out.

Figure 4:
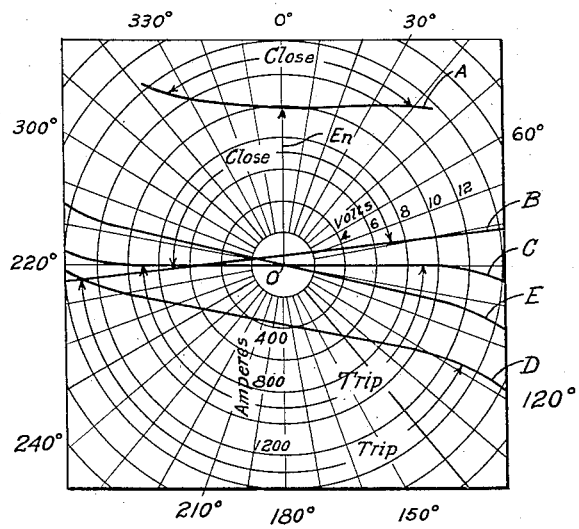
Fig. 4 is a diagram in polar co-ordinate illustrating the operation of the relay of Fig. 1 in the protector shown in Fig. 3.

The operation of the protector shown in Fig. 7 is the same as that described in connection with Fig. 3, except that, because of the short-circuiting of the phasing windings 10a, 10b and 10c when the voltage-responsive relay 31 drops out, the sensitive tripping operation of the relay 1 follows the characteristic C of Fig. 4, rather than the characteristic E. The resistors 36 of Fig. 7 may be omitted if desired.

Although I have described my invention in connection with a specific type of protective relay, it will be understood that the invention may be practiced with relay apparatus of other types known in the art. I do not intend that the present invention shall be restricted to the specific structural details, arrangement of parts or circuit connections herein set forth as various modifications thereof may be effected without departing from the spirit and scope of my invention. I desire therefore that only such limitations shall be imposed as are indicated in the appended claims.

I claim as my invention:

1. In a distribution system, a pair of electric power circuits, a circuit breaker for controlling the connection and disconnection of said circuits, directional means for causing said circuit breaker to open in response to power flow in a predetermined direction between said circuits, said directional means having a movable member operable in response to a directional power condition, means including electrical connections for restraining said movable member to cause insensitive operation of said directional means during normal operating conditions of said circuits, and means responsive to an abnormal circuit condition of one of said circuits for modifying said electrical connections to cause sensitive operation of said directional means.

2. In a distribution system, a pair of alternating current power circuits, a circuit breaker for controlling the connection and disconnection of said circuits, means including an induction disc relay for causing said circuit breaker to open in response to power flow in a predetermined direction between said circuits, said relay having a rotatable member operable in response to a directional power condition, means including electrical connections for exerting a restraining torque on said member to cause insensitive operation of said relay during normal operating conditions of said circuits and means responsive to an abnormal circuit condition of one of said circuits for modifying said electrical connections to reduce said restraining torque.

3. In a distribution system, a pair of alternating current power circuits, a circuit breaker for controlling the connection and disconnection of said circuits, means including an induction disc relay for causing said circuit breaker to open in response to power flow in a predetermined direction between said circuits, said relay having a rotatable member operable in response to a directional power condition, means including electrical connections for exerting a restraining torque on said member to cause insensitive operation of said relay during normal operating conditions of said circuits and means responsive to an abnormal circuit condition of one of said circuits for modifying said electrical connections to remove said restraining torque.

4. In a distribution system, a pair of alternating current power circuits, a circuit breaker for controlling the connection and disconnection of said circuits, means including an induction disc relay for causing said circuit breaker to open in response to a predetermined directional relationship of voltage and current in said circuits, said relay having a rotatable member operable in response to a directional power condition, means including electrical connections for exerting a restraining torque on said member to cause insensitive operation of said relay during normal operating conditions of said circuits and means responsive to an abnormal circuit condition of one of said circuits for modifying said electrical connections to reduce said restraining torque.

5. In a network distribution system, a pair of alternating current circuits, a circuit breaker for controlling the connection and disconnection of said circuits, an induction disc relay for controlling said circuit breaker, said relay having elements responsive to the voltage and current of said circuits when said circuit breaker is closed and responsive to the voltage of one of said circuits and the voltage between said circuits when said circuit breaker is open, and having a rotatable member operable in response to a directional power condition when said circuit breaker is closed, means including electrical connections for exerting a restraining torque on said member to cause insensitive operation of said relay during normal operating conditions of said circuits, and means responsive to an abnormal voltage condition of one of said circuits for modifying said connections to reduce said restraining torque.

6. In a distribution system, a pair of polyphase alternating current circuits, a circuit breaker for controlling the connection and disconnection of said circuits, an induction disc relay for controlling said circuit breaker, said relay having elements responsive to the voltage and current of said circuits when said circuit breaker is closed and responsive to the voltage of one of said circuits and the voltage between said circuits when said circuit breaker is open, means including electrical connections for producing a restraining torque in said relay to cause insensitive operation thereof during normal operating conditions of said circuits and means responsive to a symmetrical component of the polyphase voltages of one of said circuits for modifying said connections to reduce said restraining torque when an abnormal voltage condition of said one of said circuits exists.

7. In a network protector for polyphase alternating current circuits, a circuit breaker, power directional induction disc relay means for controlling said circuit breaker, said relay means having a rotatable member and electro-magnetic restraining means for exerting a biasing torque on said member, a phase-sequence network, and a relay responsive to a symmetrical electrical component furnished by said network for rendering said restraining means ineffective when said symmetrical component is of predetermined magnitude.

8. In a network protector, a circuit breaker having auxiliary contact members, an induction disc relay for controlling said circuit breaker, said relay having a phasing winding, a second relay having contact members operable from a normal position to a fault responsive position and electrical conductors connecting said phasing winding, said auxiliary contact members and said relay contact members in circuits such that said phasing winding is connected in an energizing circuit when said circuit breaker is closed and said relay contact members are in normal position; said phasing winding is de-energized when said circuit breaker is closed and said relay contact members are in fault responsive position; and said phasing winding is connected in a phasing circuit when said circuit breaker is open.

9. In a network protector, a circuit breaker having auxiliary contact members, an induction disc relay for controlling said circuit breaker, said relay having a phasing winding, a second relay having contact members operable from a normal position to a fault responsive position and electrical conductors connecting said phasing winding, said auxiliary contact members and said relay contact members in circuits such that said phasing winding is connected in an energizing circuit when said circuit breaker is closed and said relay contact members are in normal position; said phasing winding is connected in a short-circuit when said circuit breaker is closed and said relay contact members are in fault responsive position; and said phasing winding is connected in a phasing circuit when said circuit breaker is open.

10. In a network protector, a circuit breaker having auxiliary contact members, an induction disc relay for controlling said circuit breaker, said relay having a phasing winding, a second relay having contact members operable from a normal position to a fault responsive position and electrical conductors connecting said phasing winding, said auxiliary contact members and said relay contact members in circuits such that said phasing winding is connected in an energizing circuit when said circuit breaker is closed and said relay contact members are in normal position; said phasing winding is disconnected when said circuit breaker is closed and said relay contact members are in fault responsive position; and said phasing winding is connected in a phasing circuit when said circuit breaker is open.

11. In a network protector, a circuit breaker, an induction disc relay for controlling said circuit breaker, means for restraining said relay to cause insensitive operation thereof during normal conditions of said circuit when said circuit breaker is closed, fault responsive means for increasing the sensitiveness of said relay under fault conditions when said circuit breaker is closed and means including a manually adjustable conducting element for establishing connections in said protector to cause sensitive operation of said relay under all conditions when said circuit breaker is closed.

12. In a network protector, a circuit breaker, an induction disc relay for controlling said circuit breaker, means for restraining said relay to cause insensitive operation thereof during normal conditions of said circuit when said circuit breaker is closed, fault responsive means for increasing the sensitiveness of said relay under fault conditions when said circuit breaker is closed and means including a removable conducting link for establishing connections in said protector to cause sensitive operation of said relay under all conditions when said circuit breaker is closed.

13. In a distribution system, an alternating-current supply circuit, an alternating-current network circuit, a circuit breaker for controlling the connection and disconnection of said circuits, an induction disc relay for controlling said circuit breaker, said relay having a potential winding responsive to the voltage of said network, a current winding responsive to the current flow in said circuits, and a phasing winding responsive to the voltage between said circuits when said circuit breaker is open, means including electrical connections for energizing said phasing winding to produce a restraining torque in said relay to cause insensitive operation thereof when said circuit breaker is closed and said circuits are in normal electrical condition and means responsive to the voltage of said network for modifying said connections to cause sensitive operation of said relay when said circuit breaker is closed and a voltage condition of said network is below a predetermined value.

14. In a distribution system, a polyphase alternating current-supply circuit, a polyphase alternating current network circuit, a circuit breaker for controlling the connection and disconnection of said circuits, induction disc relay means for controlling said circuit breaker, said relay means having potential windings responsive to the polyphase voltage of said network, current windings responsive to the polyphase current flow in said circuits, and phasing windings responsive to voltages between said circuits when said circuit breaker is open, means including electrical connections for energizing said phasing windings to produce a restraining torque in said relay means to cause insensitive operation thereof when said circuit breaker is closed and said circuits are in normal electrical condition and means responsive to a positive symmetrical component of the polyphase voltage of said network for modifying said connections to cause sensitive operation of said relay when said circuit breaker is closed and said positive component is below a predetermined value.

JOHN S. PARSONS.